UNITED STATES PATENT OFFICE.

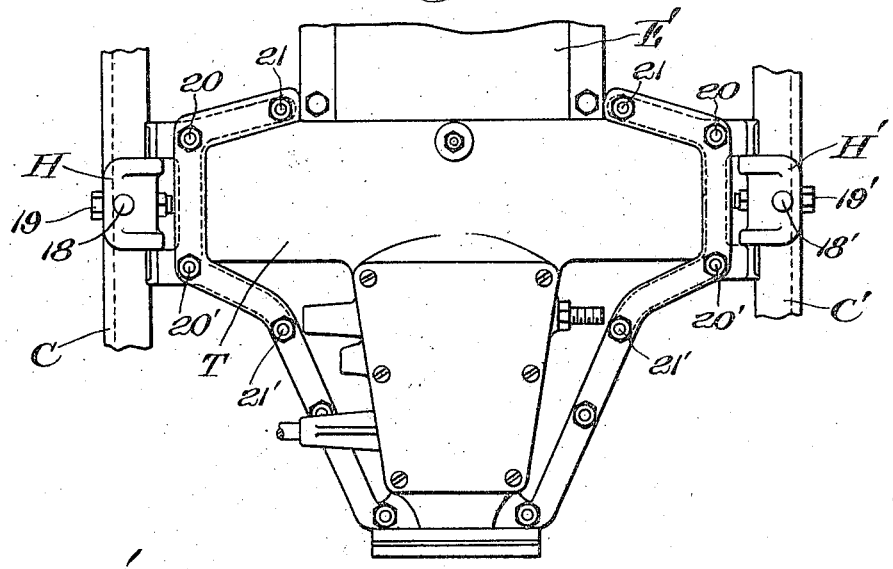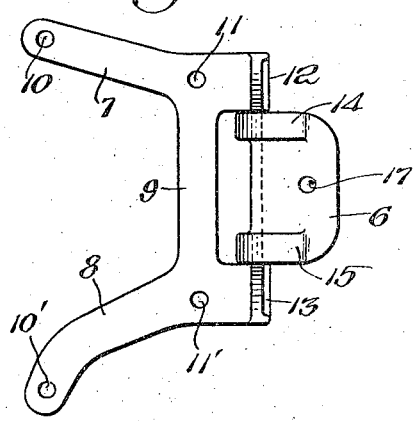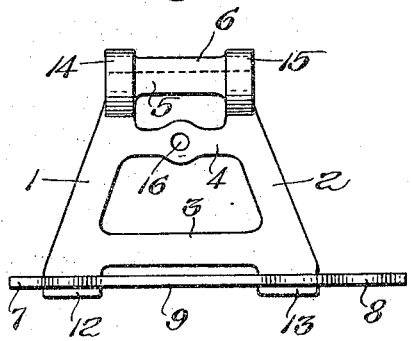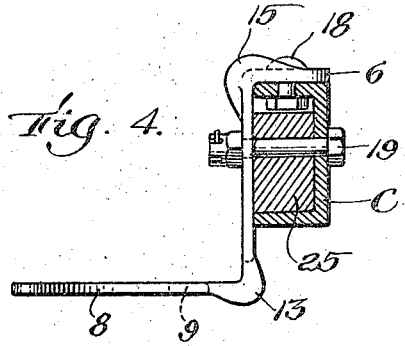

HAROLD M. BRADBURY, OF CAMBRIDGE, MASSACHUSETTS, ASSIGNOR TO SAMUEL W PRUSSIAN, OF BROOKLINE, MASSACHUSETTS.

TRANSMISSION-HANGER.

1,289,100.	Specification of Letters Patent.	Patented Dec. 31, 1918.

Application filed April 16, 1918. Serial No. 228,868

*To all whom it may concern:*

Be it known that I, HAROLD M. BRADBURY, citizen of the United States of America, and resident of Cambridge, in the county of Middlesex and State of Massachusetts, have invented new and useful Improvements in Transmission-Hangers, of which the following is a specification.

This invention relates to a supporting device and more particularly to a device for supporting the crank-case or change-speed gearing or other portion of the transmission upon the chassis of an automobile.

Devices more or less similar to the present device have been proposed heretofore, but so far as I am aware they have failed to support the transmission sufficiently tightly and have, therefore, permitted vibration and relative movement of the parts. This has resulted in chafing, under wear and breakage.

The principal objects of the present invention are to provide a device which will be free from the aforesaid defects, which may be tightly secured to the transmission, which will not shake loose from the transmission in use, and which will minimize relative movement between the device and the parts connected thereto. Other objects of the invention will be apparent from the following description and the accompanying drawings in which—

Figure 1 is a top plan view of a transmission casing supported between chassis beams by means of two of my improved hangers;

Fig. 2 is a top plan view of one of my improved hangers on an enlarged scale;

Fig. 3 is a side elevation of the hanger viewed from the left of Fig. 4; and

Fig. 4 is an end elevation of the hanger showing it attached to a chassis beam.

My improved hanger comprises a vertical portion adapted to lie along the inside of a chassis beam, an upper portion extending outwardly from the vertical portion so as to overhang the chassis beam, and a lower portion extending inwardly from the vertical portion so as to support the transmission. The vertical portion comprises two sloping legs 1 and 2 connected together by three ribs 3, 4 and 5. The upper portion comprises a flat plate 6 extending outwardly from the upper ends of legs 1 and from the upper side of rib 5. The lower portion comprises two arms 7 and 8 extending inwardly from the lower ends of legs 1 and 2 and flaring away from each other, the two arms being connected together by a rib 9. The arms 7 and 8 are provided with a pair of openings 10, 10' near their ends and with a second pair of openings 11, 11' near their bases for attaching the arms to the transmission. Rib 4 and plate 6 are provided respectively with openings 16 and 17 for attaching the hanger to the chassis beams. Reinforcing enlargements 12 and 13 are provided at the junctures of the legs and arms, and similar reinforcements 14 and 15 are provided between the legs and the overhanging plate 6.

In Fig. 1, I have illustrated the preferred use of my improved hanger, viz., for supporting the change-speed transmission on the chassis beams of an automobile. A transmission casing for planetary gearing, such as used on Ford automobiles, is illustrated at T, together with a portion of the engine casing E. The casing T is supported between the channel beams C and C', which form the side beams of the chassis, by two of my improved hangers H and H'. The plates 6 overhang the channel beams and are secured to the upper flanges thereof by means of bolts 18, 18' extending through the openings 17 in plates 6 and thence through alined opening in the channel flanges. Bolts 19 extend through openings 16 in ribs 4 and thence through alined openings in the ribs of the channels C. Spacer blocks 25 of wood or other suitable material are preferably provided between the vertical portions of the hangers and the ribs of the channels. The arms 10, 10' and 11, 11' are secured to the bottom of the transmission casing T by means of bolts 20, 20' and 21, 21'.

A cardinal feature of the present invention comprises the shape and arrangement of the arms 7 and 8. By extending the arms inwardly from the legs 1 and 2 a distance substantially as shown in the drawings, which is substantially equal to the height of the legs 1 and 2, each arm may be secured to the transmission casing at a plurality of points respectively spaced different distances from the vertical portion of the hanger, whereby the arms may be immovably and permanently secured to the transmission casing. However, the arms are not so long as to be unduly subject to breakage. By flaring the arms away from each other the transmission is braced against oscillation in a horizontal plane much more substantially. This bracing effect is materially supplemented and the arms are substantially strengthened by means of ribs 9, particularly by virtue of the fact that the ribs are disposed substantially in alinement with the pairs of openings 20, 20' near the bases of the arms.

I claim:

1. A hanger for supporting the transmission of an automobile or the like comprising a vertical portion adapted to lie along the side of a chassis beam, an upper portion extending laterally from the vertical portion so as to overhang the chassis beam, and a pair of arms extending laterally from said vertical portion so as to support the transmission, said arms extending from the vertical portion a sufficient distance to permit the transmission to be attached thereto at a plurality of points spaced different distances from the vertical portion and one of said arms flaring outwardly from the other arm.

2. A hanger for supporting the transmission of an automobile or the like comprising a vertical portion adapted to lie along the side of a chassis beam, an upper portion extending laterally from the vertical portion so as to overhang the chassis beam, a pair of arms extending laterally from said vertical portion so as to support the transmission, said arms extending from the vertical portion a sufficient distance to permit the transmission to be attached thereto at a plurality of points spaced different distances from the vertical portion and a rib connecting said arms.

3. A hanger for supporting the transmission of an automobile or the like comprising a vertical portion adapted to lie along the side of a chassis beam, an upper portion extending laterally from the vertical portion so as to overhang the chassis beam, a pair of arms extending laterally from said vertical portion so as to support the transmission, said arms extending from the vertical portion a sufficient distance to permit the transmission to be attached thereto at a plurality of points spaced different distances from the vertical portion, and a rib connecting said arms, said rib being substantially in alinement with points of attachment in the respective arms.

4. A hanger for supporting the transmission of an automobile or the like comprising a vertical portion adapted to lie along the side of a chassis beam, an upper portion extending laterally from the vertical portion so as to overhang the chassis beam, a pair of arms extending laterally from said vertical portion so as to support the transmission, said arms extending from the vertical portion a sufficient distance to permit the transmission to be attached thereto at a plurality of points spaced different distances from the vertical portion, and a rib connecting said arms, said rib being substantially in alinement with the points of attachment in the respective arms which are disposed nearest to said vertical portion.

5. A hanger for supporting the transmission of an automobile or the like comprising a vertical portion adapted to lie along the side of a chassis beam, an upper portion extending laterally from the vertical portion so as to overhang the chassis beam, and a pair of arms extending laterally from said vertical portion so as to support the transmission, said arms flaring outwardly from each other and extending from the vertical portion a sufficient distance to permit the transmission to be attached thereto at a plurality of points spaced different distances from the vertical portion.

Signed by me at Boston, Massachusetts, this eleventh day of April, 1918.

HAROLD M. BRADBURY.